United States Patent [19]
Okada et al.

[11] Patent Number: 4,911,514
[45] Date of Patent: Mar. 27, 1990

[54] OPTICAL COUPLER AND PROCESS FOR PREPARATION THEREOF

[75] Inventors: Hiroshi Okada; Masatoshi Toda, both of Tokyo; Shingo Suzuki, Zama; Manabu Kagami, Kawasaki; Masayoshi Komiya, Tokyo, all of Japan

[73] Assignee: Mitsubishi Rayon Company, Ltd., Tokyo, Japan

[21] Appl. No.: 181,578

[22] Filed: Apr. 14, 1988

[30] Foreign Application Priority Data

Apr. 20, 1987 [JP] Japan .................................. 62-58731

[51] Int. Cl.$^4$ .............................................. G02B 6/26
[52] U.S. Cl. .................................................. 350/96.15
[58] Field of Search ................. 350/96.15, 96.21, 96.16

[56] References Cited
U.S. PATENT DOCUMENTS

4,400,055 8/1983 Ozeki et al. ...................... 350/96.15
4,514,057 4/1985 Palmer et al. ..................... 350/96.15
4,629,284 12/1986 Malavieille ....................... 350/96.21
4,720,161 1/1988 Malavieille ....................... 350/96.15

Primary Examiner—William L. Sikes
Assistant Examiner—Phan T. Heartney
Attorney, Agent, or Firm—Oblon, Spivak, McClelland, Maier & Neustadt

[57] ABSTRACT

An optical coupler comprising N number (where N stands for an integer of not less than 2) of optical fibers having one ends integrated and the other ends branched and N number of optical coupler parts, wherein the top end of each light branching-coupling optical fiber has a plane of 360°/N including an inclined branching fiber-abutting plane inclined at an angle $\theta$ to the optical fiber axis and a light-coupling plane vertical to the abutting plane, each of the optical coupler parts is constructed by inserting the light branching-coupling optical fiber in an optical fiber-retaining hole of a block having the same plane as the branching fiber-abutting plane of the optical fiber and a light-coupling plane vertical to the abutting plane, and the branching fiber-abutting planes of the optical coupler parts are engaged with each other to construct a optical coupler.

3 Claims, 6 Drawing Sheets

OPTICAL COUPLER AND PROCESS FOR PREPARATION THEREOF

BACKGROUND OF THE INVENTION

(1) Field of the Invention

The present invention relates to an optical coupler comprising N number of optical fibers. More particularly, the present invention relates to an optical coupler comprising N number of optical fibers and N number of integrally assembled optical coupler parts, each optical fiber comprising an optical fiber-coupling portion having a coupling angle to the optical fiber axis of $\theta$ and including 1 or 2 planes of $360°/N$ and an optical fiber-connecting end face, and each coupler part having a retention hole for retaining the optical fiber therein, a plane of which is the same as the 1 or 2 planes crossed at the angle of $360°/N$ at the optical fiber-connecting portion and a plane vertical to the 1 or 2 planes, which coupler is particularly applicable to the branching or transmitting of optical signals to a plurality of points in an optical network.

(2) Description of the Related Art

Figure 9:
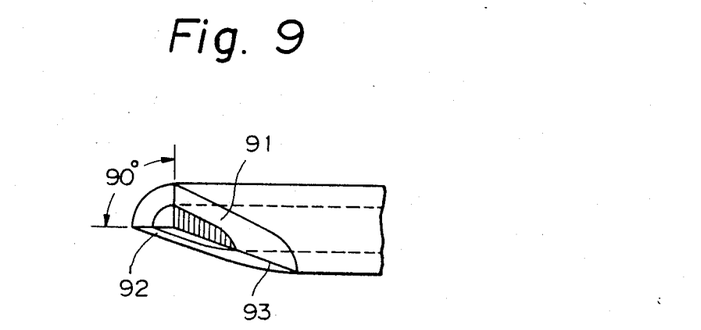
Figure 10:
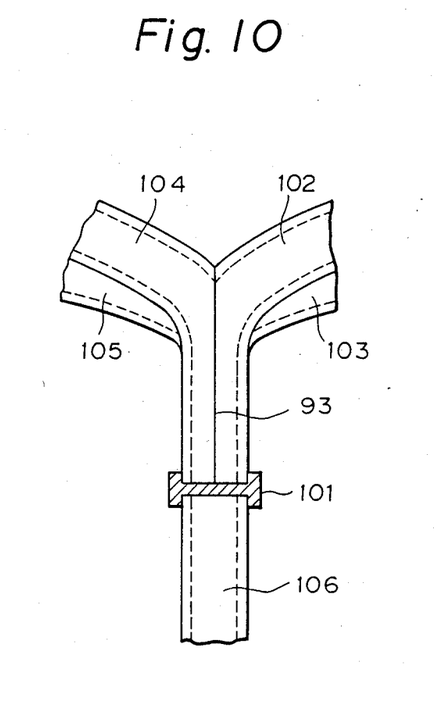

An optical coupler for branching optical signals from an optical signal generator to a plurality of receivers through optical fibers or coupling optical signals from transmitters in an optical network has been developed. For example, Japanese Unexamined Patent Publication No. 63-6049 discloses an optical coupler comprising one light-transmitting optical fiber and a plurality of branching core-clad optical fibers connected to the light-transmitting fiber, in which a branching or coupling of the optical signals is effected between these optical fibers. As shown in FIG. 9, illustrating a light-branching coupler of this type, each of N number, for example, four, of branching optical fibers in the light-branching and coupling end portion is processed so that the end portion of each optical fiber has two planes 91 and 92 having an angle of $360°/N$ (=4), and as shown in FIG. 10, the intersection lines 93 of the two planes of each of the optical fibers 102, 103, 104, and 105 are superimposed on each other to form an integrated end portion, and the end of a light-transmitting optical fiber 106 is connected to this integrated end portion through a sleeve 101 for effecting a branching and coupling of optical signals.

Since the branching-coupling end of each light-branching optical fiber used in the optical coupler of this type has an end comprising two planes 91 and 92 having an angle of $360°/N$ (N being for example, 4), this optical fiber is prepared by cutting the end of a starting optical fiber by a cutter and polishing the cut end face by a polisher. However, according to this method, a precise processing of the end face of the optical fiber is difficult and a deviation of the angle at the end of the optical fiber is large. Accordingly, when a light-branching optical fiber is assembled as shown in FIG. 10, it is impossible to attain a satisfactory light branching-coupling efficiency in the assembled optical coupler, and therefore, the optical coupler of this type is unsatisfactory from the practical view-point.

Moreover, since connection of N number of end face-processed optical fibers 102, 103, 104, and 105 to one optical fiber 106 is effected through the sleeve 101, the mechanical strength of the light branching-coupling portion may be weakened and the light branching-coupling property become unsatisfactory.

SUMMARY OF THE INVENTION

In view of the above, a primary object of the present invention is to provide an optical coupler which is assembled by a simple operation and in which the light branching-coupling operation can be performed at a high efficiency.

More specifically, in accordance with the present invention, there is provided an optical coupler comprising an integrated assembly of N number of light branching-coupling optical fibers and N number of optical coupler parts, each optical fiber comprising an optical fiber-coupling end portion having an optical fiber-connecting angle to the optical fiber axis of $\theta$, and including one or two inclined planes of $360°/N$ and an end face vertical to these one or two planes, and each optical coupler part having a retention hole for retaining the light branching-coupling optical fiber therein, a plane of which is the same as the two inclined planes of an angle of $360°/N$ at the end of the light branching-coupling optical fiber and a plane of which is vertical to those planes and is the same as the plane of the top end face of the light branching-coupling optical fiber.

DESCRIPTION OF THE PREFERRED EMBODIMENTS

Figures 1A, 1B, 2:
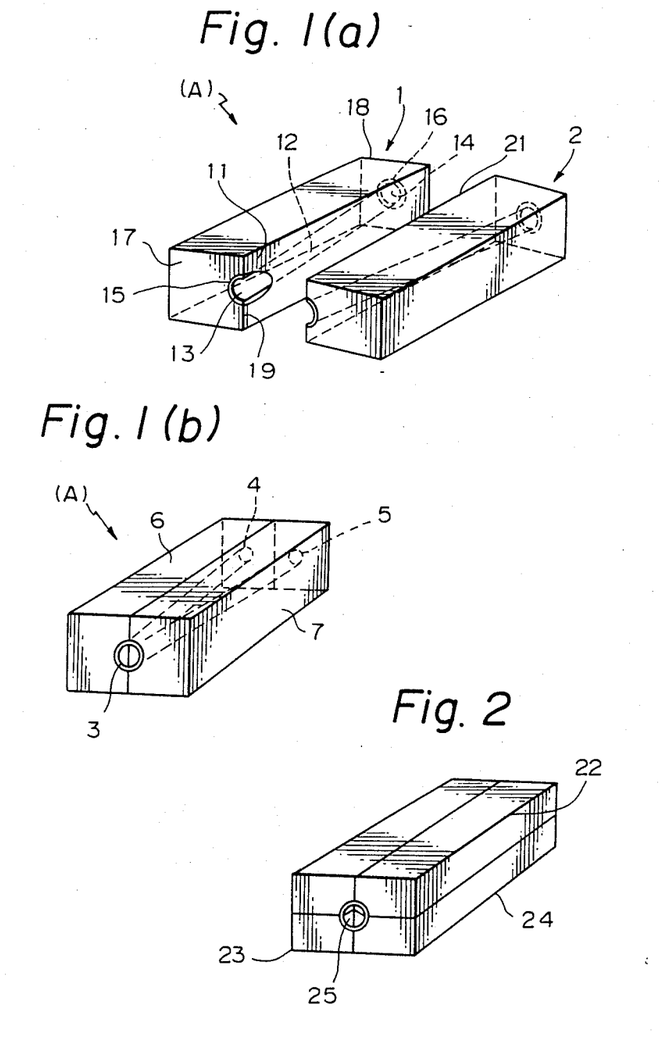
FIG. 1(a) is a perspective view of a block constituting a 2:1 optical coupler according to the present invention.
FIG. 1(b) is a perspective view of a optical coupler constructed by the block shown in FIG. 1(a).
FIG. 2 is a perspective view of a 4:1 optical coupler.

FIG. 1(b) is a perspective view of an optical coupler having a light branching-coupling ratio of 2:1 and comprising two light-branching optical fibers according to the present invention, and FIG. 1(a) is a perspective view of optical coupler blocks 1 and 2 constituting the light-branching coupling of the present invention. These FIGS. 1(a) and 1(b) illustrate an embodiment wherein the blocks 1 and 2 have the same trapezoidal shapes.

As shown in FIG. 1(a), the block 1 has an abutting face 11 to be bonded to the other block 2 having a symmetrical structure, and an end face 17 adjacent and vertical to the abutting face 11. A retention hole 12 is pierced through the interior of the block 1 from an angular portion 19 defined by the abutting face 11 and end face 17 with an inclination of an angle of about 3° to about 30°, especially about 10°, to the abutting face 11, to reach the other end face 18 of the block 1. A chamfer portion 15 is formed on the top end 13 of the retention hole 12.

Figure 5A:
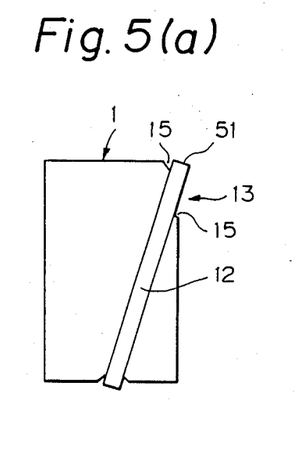
FIG. 5 is a sectional view of the block illustrating the states before and after the heat treatment.

When a light branching-coupling part is constructed by using the block 1, an optical fiber (not shown) is inserted in the retention hole 12 of the block 1 so that the top end of the optical fiber projects from the top end 13 of the retention hole 12, and the projecting end face of the optical fiber is heat-treated by a heating apparatus for treating the end face, described hereinafter. By this heat treatment, as shown in FIG. 5(a), plastic deformation of the projecting portion of the optical fiber present on the top end 13 of the retention hole 12 occurs to form a plane 52 having an angle of $\theta$ to the optical fiber axis 56 in the plane 11 of 360°/2 and a top end plane 53, and contain the excess portion of the optical fiber in chamfer portions 54 and 55, whereby optical coupler parts 6 and 7 having the same planes as the abutting face 13 and end face 17 shown in FIG. 1(a) are constructed by the end faces 52 and 53 of the heat-treated optical fiber. If the abutting faces of the parts 6 and 7 are caused to abut against each other and the parts 6 and 7 are integrated with each other, an optical coupler A having an optical fiber-connecting end 3 on one end and optical fiber branch ends 4 and 5 on the other end, as shown in FIG. 1(b), is obtained.

A material having a good processability at the block-manufacturing step and showing a good heat resistance at the step of forming the light branching-coupling part by the heat treatment is preferably used for the formation of the block of the light-branching coupler. For example, a metal can be used, such as brass, and a resin, for example, a fiber-reinforced plastic material such as polybutylene terephthalate or polyethylene terephthalate reinforced with a glass fiber or carbon fiber. The inclination angle between the axis of the optical fiber inserted in the retention hole of the block and the abutting face of the block is preferably about 3° to about 30°, and in order to increase the light-branching coupling characteristic of the optical coupler of the present invention, it is especially preferable that this inclination angle is about 10° or smaller. The number of blocks constituting the optical coupler of the present invention is not limited to 2 as in the embodiment shown in FIG. 1 but may be appropriately changed according to need, for example, to 4 as in an optical coupler having a light branching-coupling ratio of 4:1, as shown in FIG. 2. Referring to FIG. 2, wherein four blocks 21, 22, 23 and 24 are arranged to construct the optical coupler of the present invention, reference numeral 25 represents an optical fiber-connecting end. The guide hole of the block may be formed so that not only an optical fiber but also an optical fiber cable may be inserted in the guide hole.

The heating apparatus for fabricating the branching-coupling part of the optical coupler of the present invention by using the above-mentioned optical fiber and block will now be described in detail with reference to the accompanying drawings.

Figure 3:
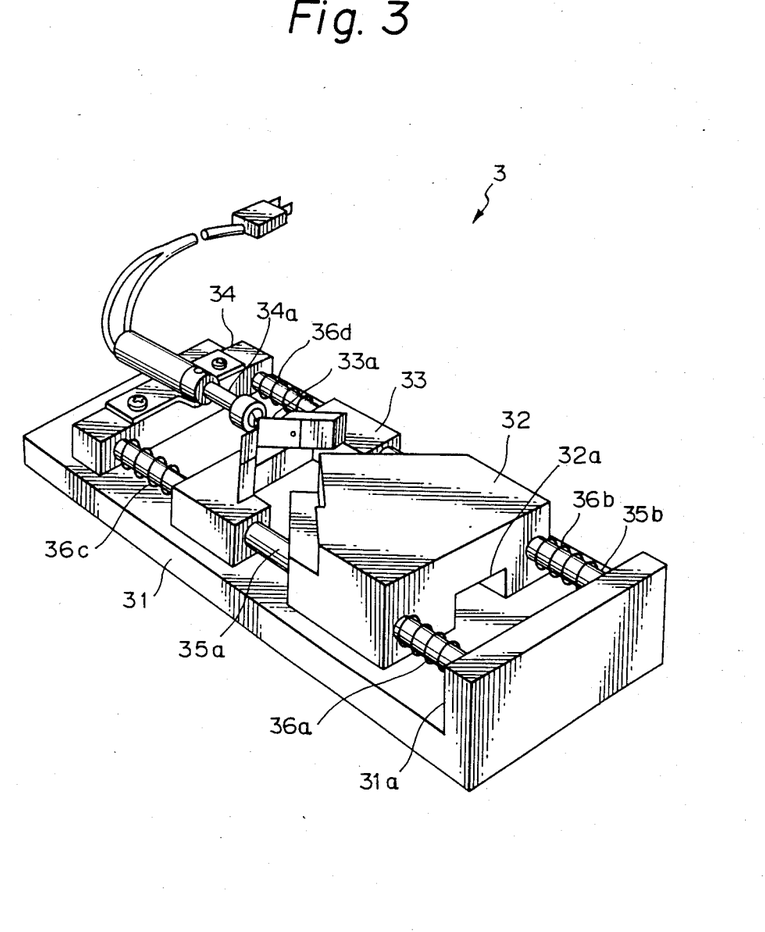
FIG. 3 is a perspective view of a heating apparatus for treating the end face of an optical fiber projected from the rectangular end portion of the block.
Figure 4A:
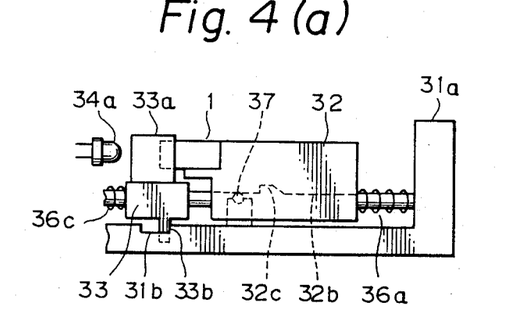
FIG. 4 is a sectional view of the treatment procedures in the apparatus shown in FIG. 3.
Figure 4B:
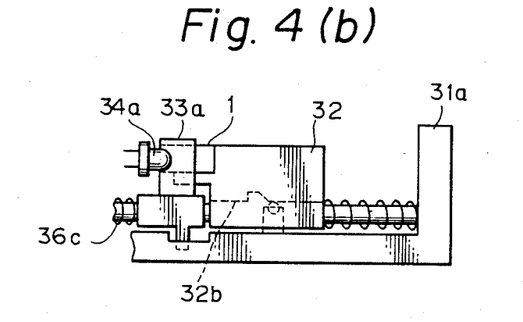
Figure 4C:
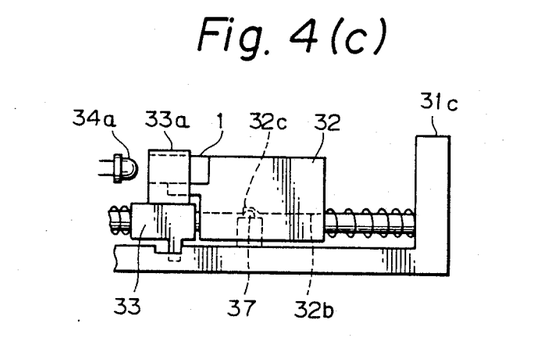

FIG. 3 is a perspective view of this heating apparatus, and FIG. 4 is a diagram illustrating the procedures of fabricating the light branching-coupling apparatus part used in the present invention by using this heating apparatus.

In the heating apparatus 3 shown in FIGS. 3 and 4, on a housing 31 having a stopper 31a on one end, a block-holding member 32 for holding the block 1 having the optical fiber inserted therein, a mirror surface plate-holding member 33 for holding a mirror surface plate 33a having a substantially rectangular shape, and a heater-fixing stand 34 for holding and fixing a heater 34a having a rectangular heater surface are arranged in a line from the side of the stopper 31a. The positional relationship among the block 1, mirror surface plate 33a, and heater 34a held in the respective holding members and stand is such that the optical fiber-connecting end 13 in FIG. 1(b) of the block 1 having the optical fiber inserted therein abuts against the corner portion of the mirror surface of the mirror surface plate 33a and the heater 34a abuts against and confronts the back surface of the mirror surface plate 33a. The shapes of the mirror surface plate 33a and heater 34a are the same as that of the rectangular portion 19 of the block 1, so that the optical fiber-connecting end 13 of the block 1, the rectangular mirror surface plate 33a, and the heater 34a adhere closely together when fitted to one another. Metal rods 35a and 35b having a columnar shape and fixed to both ends of the stopper 31a are arranged on the respective fixing and holding members arranged on the housing 31 so that the metal rods 35a and 35b extend through both ends of the block-holding member 32 and mirror surface plate-holding member 33 to the end of the heater-holding member 34. By moving the block-holding member 32 and mirror surface plate-holding member 33 along the metal rods 35a and 35b toward the heater-fixing stand 34 or stopper 31a, the block 1 can be brought into contact with the mirror surface plate 33a and heater 34a or separated therefrom.

In the heating apparatus of the present invention having the above-mentioned main structural members, an auxiliary structural member may be disposed to improve the operation efficiency of the end face treatment. The steps of fabricating the optical coupler of the present invention will not be described with reference to FIG. 4. Springs 36a and 36b having one end engaged with the block-holding member 32 and the other end engaged with the stopper 31a and wound on the peripheries of the metal rods between the block-holding member and the stopper 31a are arranged so that the block-holding member 32 is not allowed to abut against the mirror surface plate-holding member 33 unless an external force exceeding the dragging force of the springs 36a and acting toward the mirror surface plate 33a is imposed on the block-holding member 32, whereby the block 1 having the optical fiber inserted therein is held on the block-holding member 32 [see FIG. 4(a)]. The mirror surface plate 33a is moved toward the heater 34a and the back surface of the mirror surface plate 33a is brought in contact with the heater 34a to heat the mirror surface plate. Then, the block-holding member 32 is moved by applying external force toward the heated mirror surface plate 33a and the integrated assembly of the block-holding member 32, the block 1 and the mirror surface plate 33a is moved toward the heater 34a to bring the back surface of the mirror surface plate 33a in contact with the head of the heater 34a, as shown in FIG. 4(b). While maintaining this state, the top end of the optical fiber slightly projecting from the end portion 13 of the retention hole of block 1 is plastically deformed by heat of the heater and the optical fiber is engaged with the block 1. After the above-mentioned heat treatment, the integrated assembly of the mirror surface plate 33a, the block 1, and the block-holding member 32 is moved by the force of the spring 36c, and the recess 32a is again engaged with the plunger 37 to bring about a stationary state, and in this stationary state, the mirror surface plate 33a is cooled. After the mirror surface plate 33a has been cooled, as shown in FIG. 4(a), the block-holding member 32 having the block 1 held thereon is moved toward the stopper 31a and the block 1 is separated from the heater 33a. According to the above-mentioned procedures, the light branching-coupling apparatus part of the present invention is constructed.

A material on which a good mirror surface can be formed and which has a relatively good heat conductivity is preferably used as the material of the mirror surface plate. For example, stainless steel is preferably used. When a plastic optical fiber, for example, "Eska SK-40" supplied by Mitsubishi Rayon, is subjected to the end face heat treatment, the temperature of the mirror surface plate is preferably about 140° C. and more over.

The heating apparatus shown in FIG. 3 is used in the embodiment where two blocks are used, as shown in FIG. 1. When the light branching-coupling apparatus part of the present invention is constructed by using three or four blocks, a block 1 and a mirror surface plate having a shape forming two planes of 360°/N with the optical fiber-connecting top end face of the block 1 are preferably used.

As shown in FIG. 5, the procedures of the heat treatment by using the above-mentioned heating apparatus will now be described.

Figure 5B:
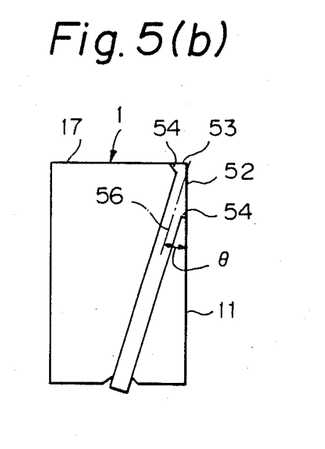

First, an optical fiber 51 is inserted into the retention hole 12 of the block 1 provided with the chamfer portion 15, and in the state wherein the top end of the optical fiber projects slightly from the end portion 13 of the block 1, the optical fiber is fixed to the block 1. The block 1 having the optical fiber inserted therein is attached to the heating apparatus shown FIGS. 3 and 4 and the heat treatment is carried out. By this heat treatment, as shown in FIG. 5(b), the top end portion of the projecting optical fiber is plastically deformed, whereby a light branching-coupling plane 52 of 360°/N, which is the same plane as the plane of the abutting face 11 of the block 1, and the top end face 53 of the optical fiber, which is the same plane as the plane of the end face 17 of the block 1, are formed, and a part of the optical fiber is filled in the chamfer portion 13 to form an engaging portion 54. Accordingly, the shape of the light branching-coupling end face formed by the optical fiber is formed more precisely than in the conventional technique, and this precision can be remarkably increased in the optical coupler of the present invention. Furthermore, the optical coupler of the present invention is assembled by engaging abutting faces of the light branching-coupling part comprising an optical fiber having specific end faces and a block, and therefore, the mechanical strength of the light-branching coupler is high and the light branching-coupling operation stability is greatly improved. Further, it is not necessary to separately prepare a jig for the processing of the end face and the block member per se of the optical coupler can be employed as a jig for the processing of the end face to simplify the process for the preparation of the optical coupler.

Figure 6:
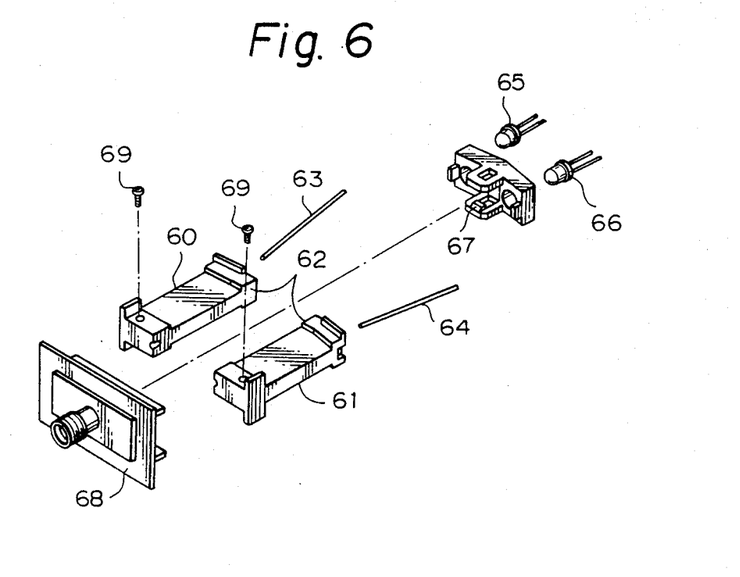
FIG. 6 is an exploded view of light emitting device and photodetector integrated optical coupler.

In the optical coupler of the present invention, a light emitting device and photodetector may be arranged integrally with the end face of the optical fiber on the branching side. FIG. 6 is an exploded view illustrating an example of the optical coupler having integrated light-emitting and light-receiving elements. Referring to FIG. 6, a 2:1 optical coupler is assembled by engaging abutting faces 62 of blocks 60 and 61. Reference numerals 63 and 64 represent light branching-coupling pathforming optical fibers, reference numerals 65 and 66 represent light emitting device and photodetector, respectively, reference 67 represents a holding portion for engaging the blocks 60 and 61 with each other and fixing the light-emitting and light-receiving elements 65 and 66 to the end faces of the optical fibers arranged in the blocks, reference numeral 68 represents a flange portion for engaging the blocks 60 and 61 with each other tightly and engaging an optical fiber having a plug or the like with the optical fiber-connecting end of the optical coupler, which has a screw for dismountably fixing the plug of the optical fiber, and reference numeral 69 represents a screw for engaging the flange portion 68 with the bloc 60 and 61.

Figure 7:
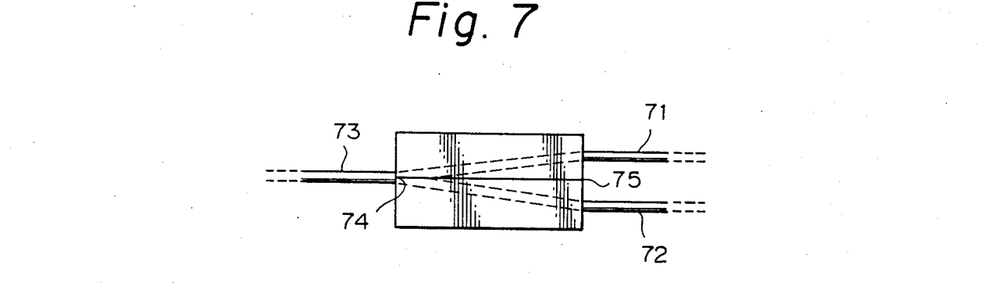
FIG. 7 is a top view of an optical coupler of the pig tail type.

FIG. 7 shows an optical coupler of the pig tail type according to another embodiment of the present invention. In this optical coupler, the optical fiber inserted in the retention hole of the optical coupler part is not cut but held on the branching side end. In FIG. 7, reference numerals 71, 72 and 73 represent optical fibers, reference numeral 74 represents an optical fiber-connecting end, and reference numeral 75 represents a branching side.

The other optical fiber for a transmission of light, which is connected to the optical fiber-connecting end of the optical coupler, may be either a fixed type or a dismountable type, as shown in FIG. 6 or 7.

Figure 8:
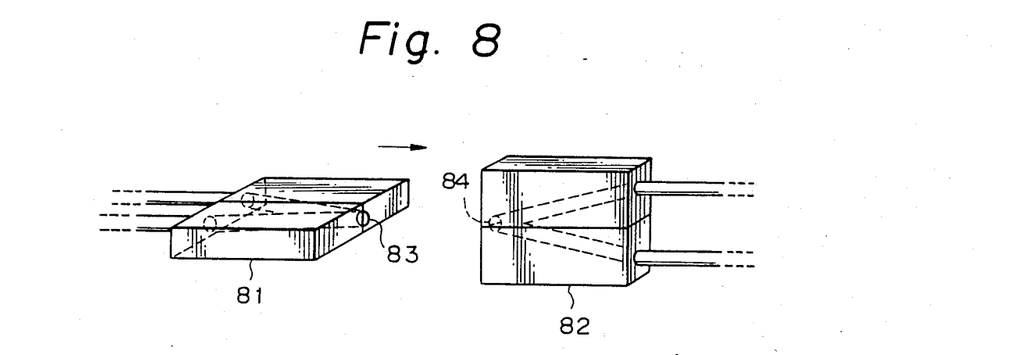
FIG. 8 is a diagram illustrating a star coupler comprising a plurality of optical couplers; and, FIGS. 9 and 10 are diagrams illustrating a conventional optical coupler.

A star coupler can be constructed by using a plurality of optical couplers of the present invention and connecting optical fiber-connecting ends of these optical couplers. An example thereof is shown in FIG. 8. In FIG. 8, reference numerals 81 and 82 represent optical couplers, and a 2:2 star coupler is constructed by engaging optical fiber-connecting ends 83 and 84 of the optical couplers in the direction indicated by an arrow. Note, to enhance the mixing effect, preferably a mixing rod having the same refractive index as that of the optical fiber is inserted between the optical fiber-connecting ends 83 and 84.

We claim:

1. An optical coupler comprising N number (wherein N stands for an integer of not less than 2) of optical fibers having one end thereof integrated and formed into an approximately circular connecting end and the other end thereof branched in a branching portion, wherein said optical coupler is comprised of N number of optical coupler parts dividing the connecting end into sectors of a central angle of 360°/N, the optical coupler parts each having a light-coupling plane divided with a central angle of 360°/N and a light branching fiber-abutting plane formed on the plane to be abutted on the other optical coupler part and together constitute said optical coupler by abutting the light branching fiber-abutting planes of the respective optical coupler parts, each of the optical coupler parts comprises a heat-resistant block and an optical fiber, said block having an optical fiber retaining hole, said optical fiber retaining hole being inclined at an angle $\theta$ to the abutting plane and having one end thereof formed into a portion at which at least two planes including the abutting plane cross and provided with a chamfer portion, and the light branching fiber-abutting and light-coupling planes are formed by inserting the optical fiber in the optical fiber retaining hole of said block so that the top end of the optical fiber projects from said one end of said optical fiber retaining hole, pushing a heated mirror surface plate against the projecting optical fiber end to fill a part of the optical fiber end into the chamfer portion.

2. An optical coupler according to claim 1 comprising light-receiving and light-transmitting elements arranged on the end faces of optical fibers arranged in the branching portion of the optical coupler.

3. An optical coupler as set forth in claim 1, wherein the angle $\theta$ between the abutting plane of the top end of the optical fiber arranged in the light branching-coupling part and the axis of the optical fiber is 3° to 30°.

* * * * *